(12) United States Patent
Feichtinger

(10) Patent No.: US 7,359,178 B2
(45) Date of Patent: Apr. 15, 2008

(54) ELECTRICAL FUNCTIONAL UNIT

(75) Inventor: Thomas Feichtinger, Graz (AT)

(73) Assignee: EPCOS AG, Munich (DE)

( * ) Notice: Subject to any disclaimer, the term of this patent is extended or adjusted under 35 U.S.C. 154(b) by 24 days.

(21) Appl. No.: 11/238,071

(22) Filed: Sep. 28, 2005

(65) Prior Publication Data

US 2006/0120016 A1 Jun. 8, 2006

(51) Int. Cl.
H01G 4/228 (2006.01)
H01G 4/06 (2006.01)

(52) U.S. Cl. ............. 361/306.3; 361/311; 361/328

(58) Field of Classification Search ........ 361/328–330, 361/306.1, 306.3, 311–313
See application file for complete search history.

(56) References Cited

U.S. PATENT DOCUMENTS

| 3,745,431 | A | | 7/1973 | Imamura et al. | |
| 4,706,162 | A | | 11/1987 | Hernandez et al. | |
| 5,583,738 | A | * | 12/1996 | Kohno et al. | 361/312 |
| 5,870,273 | A | * | 2/1999 | Sogabe et al. | 361/306.3 |
| 6,069,786 | A | * | 5/2000 | Horie et al. | 361/303 |
| 6,456,481 | B1 | | 9/2002 | Stevenson | |
| 6,525,628 | B1 | * | 2/2003 | Ritter et al. | 333/172 |
| 2002/0067588 | A1 | * | 6/2002 | Monsorno | 361/306.3 |
| 2004/0125540 | A1 | * | 7/2004 | Vieweg et al. | 361/306.3 |

FOREIGN PATENT DOCUMENTS

| DE | 19635276 | 3/1998 |
| DE | 10224565 | 12/2003 |
| DE | 10224566 | 12/2003 |
| EP | 1006535 A1 | 6/2000 |
| GB | 2260646 A | 4/1993 |
| JP | 2001-291638 | 10/2001 |
| JP | 2003-151852 | 5/2003 |
| WO | WO95/10118 | 4/1995 |

OTHER PUBLICATIONS

Written Statement of German Patent Examiner regarding U.S. Pat. No. 6,456,281 (Dec. 15, 2005).

* cited by examiner

Primary Examiner—Eric Thomas
(74) Attorney, Agent, or Firm—Fish & Richardson P.C.

(57) ABSTRACT

An electrical function unit includes a carrier having dielectric layers, electrically conductive layers, and a first contact on a surface of the carrier, where the dielectric layers and electrically conductive layers are stacked such that electrically conductive layers are between dielectric layers. The dielectric layers and electrically conductive layers form a multilayer capacitor in the carrier. The multilayer capacitor includes a first stack of first electrically conductive layers that are electrically interconnected and a second stack of second electrically conductive layers that are electrically interconnected. The first stack is capacitively coupled to the first contact, and the first contact has substantially no galvanic connection to the first stack or to the second stack.

20 Claims, 3 Drawing Sheets

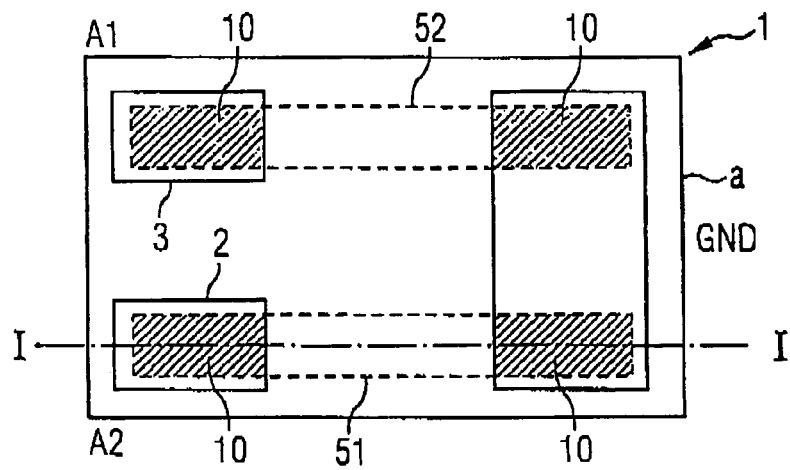
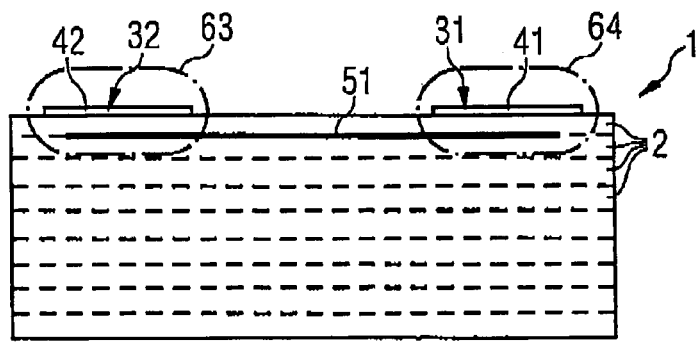
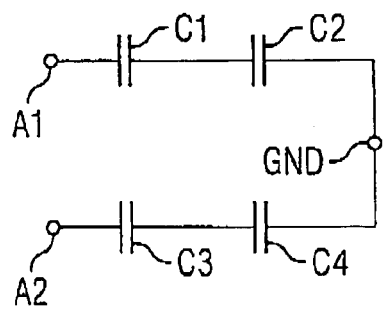
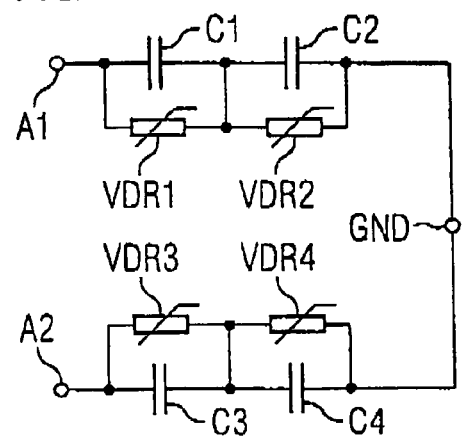

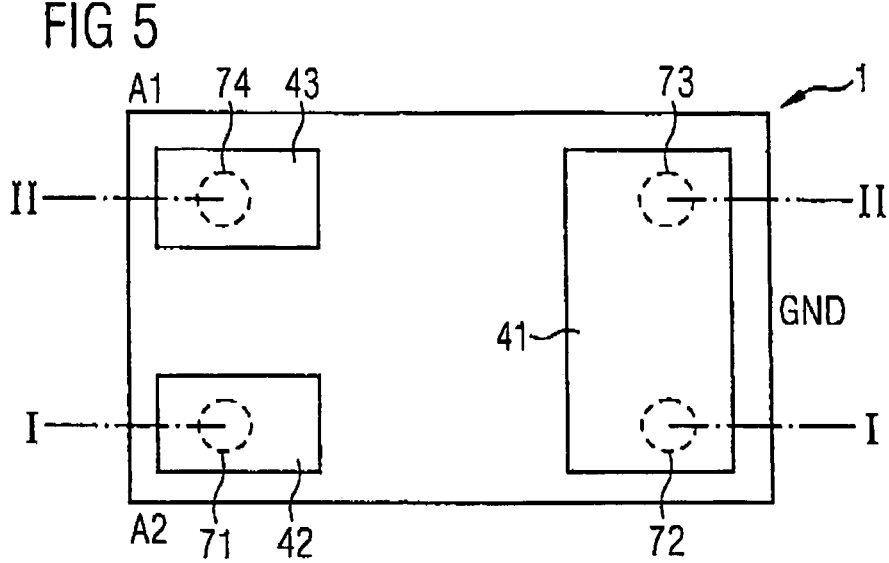
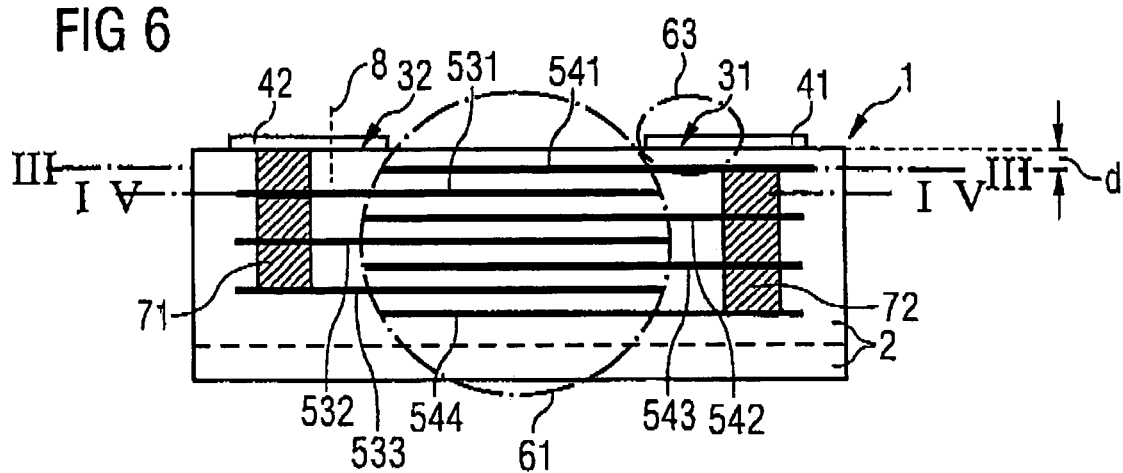
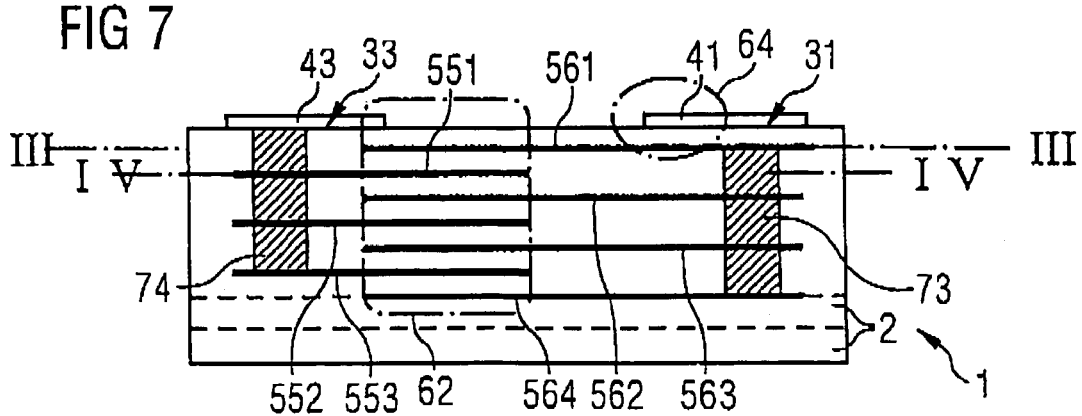

ELECTRICAL FUNCTIONAL UNIT

BACKGROUND

Technical Field

The invention relates to an electrical function unit with a carrier made from ceramic layers stacked on top of one another. A contact surface is arranged on an outer side of the carrier.

From German Patent No. DE 102 24 565 A1, an electrical multilayer component is known in which multilayer capacitors are arranged opposite one another in a carrier. These are wired up to a common earth electrode disposed on a frontal face of the carrier. Internally arranged electrode layers are connected directly to contacts on the lateral face of the carrier.

Other multilayer capacitors are known for example from Japanese Patent No. JP 2003-151852, German Patent No. DE 102 24 565 A1 and European Patent No. EP 1 006 535 A1.

From U.S. Pat. No. 4,706,162, a multilayer capacitor is known in which the electrode layers lying on the same voltage are conductively connected via a feedthrough.

From U.S. Pat. No. 3,745,431, a capacitor stack with capacitances connected in series is known. Other stack arrangements of serial and parallel capacitances are known from British Patent No. GB 2260646.

Other multilayer components with integrated capacitances are known e.g. from WO 95/10118.

The objective of the present invention is to provide an electrical function unit by which parasitic capacitances may be reduced.

This objective is achieved by an electrical function unit in accordance with claim 1. Advantageous configurations of the function unit are the subject of sub-claims.

An electric function unit having a carrier is proposed. The carrier is formed from dielectric, preferably ceramic layers, stacked on top of one another.

In one embodiment of the function unit, it is provided that all of the ceramic layers contain an electric functional ceramic. In this context, the term "electric functional ceramics" refers to all materials that provide e.g. a high dielectric constant when making capacitors or, for example, suitable dependence on voltage of their resistances when making varistors. For the purposes of the component described here, the principal characteristic of functional ceramics is that, besides their mechanical carrier function, which lends the component its mechanical stability and also serves as a base for electrode layers or other electrically conductive elements, they also provide at least one additional electric function. The dependency on voltage of the electrical resistance or the dielectric constant has already been described.

However, there are also other material properties that are taken into consideration and which may make an electric functional ceramic out of a common ceramic material that is used as a carrier. Temperature-dependency of the electrical resistance, temperature-dependency of the dielectric constant or other similar properties are particularly noteworthy. Of particular interest for the present function unit are materials that are necessary for producing capacitors, varistors or inductors.

A contact surface is formed on a surface of the carrier. This contact surface conducts electricity. It may be used to provide further contacting for the electric function unit. Such a contact surface may be formed for example by a layer made from an electrically conductive material on the surface of the carrier. However, the contact surface may also be formed by an electrically conductive material of any shape, for example, even by a ball of solder. The important point is merely that an electrically conductive material be present on one part of the surface of the carrier.

In intermediate electrically conductive layer between two ceramic layers is also provided. The intermediate conductive layer is thus arranged between two ceramic layers. The contact surface is coupled capacitively with the intermediate layer.

In this context, the term capacitive coupling refers to the fact that the contact surface and the intermediate layer form a capacitor. This means that they overlap each other at least partially, and a dielectric material which matches the material of the ceramic layers forming the capacitor between the two electrodes is placed between the contact surface and the intermediate layer.

The electric function unit described here exploits the basic idea according to which internal electrode layers of the carrier are not galvanically coupled directly with external contacts of the carrier. Rather, the coupling takes place at least primarily via capacitive coupling between interior electrode layers and/or between intermediate layers arranged between ceramic layers and external contact surfaces. When creating very small capacitances in a multilayer component, with such a procedure it is possible to prevent undesirable stray capacitances from being created between an external electrode and internal electrodes. It is also possible to prevent undefined or excessively large parasitic inductances from being created by external contact of the internal electrode layers.

Because the capacitive coupling makes it possible to define the capacitive effect produced by the external contact surface on internal electrode layers more precisely, undesirable capacitive effects may also be prevented.

In one embodiment of the function unit, the contact surface is galvanically separated from the intermediate layer. This means that any electrical contact between the contact surface and the intermediate layer is largely prevented. In this way, the coupling between the contact surface and the intermediate layer is defined at least primarily by the capacitive coupling. This capacitive coupling may be determined in turn by geometric parameters, that is to say ultimately by the size of the overlapping area between the two electrode layers, or by the distance between the electrode layers. This may be determined by the thickness of the ceramic layers used. Even the ceramic material between the electrodes may particularly determine the capacitive coupling by virtue of the dielectric constant $\epsilon$.

In another embodiment of the function unit, additional contact surfaces are arranged on the surface of the carrier. By arranging additional contact surfaces, the function unit may be used for example to create a filter or also another component that includes capacitive elements.

In a further embodiment of the function unit, the intermediate layer is capacitively coupled with at least one additional contact surface. This results in an embodiment of the function unit in which the intermediate layer is capacitively coupled with two different contact surfaces. This in turn yields a function unit in which a serial connection of two capacitors is realized. The first capacitor is defined by the capacitive coupling between the intermediate layer and the first contact surface. The second capacitor is defined by the capacitive coupling between the intermediate layer and the second contact surface. The galvanic connection between the two capacitances is represented by the intermediate layer itself.

In another embodiment of the function unit, the intermediate layer is galvanically coupled with a contact surface. This embodiment of the function unit has the advantage that it is possible to produce multilayer capacitors and/or integrate them in the carrier of the function unit. Multilayer capacitors may be galvanically contacted directly from outside by a contact surface provided for that purpose.

In another embodiment of the function unit, stacks of intermediate layers arranged on top of one another are provided in the carrier and form at least one multilayer capacitor. The provision of multilayer capacitors in the carrier has the advantage that the function unit may be used to create greater capacitances than by simple overlapping of two individual electrode layers.

In another embodiment of the function unit, at least two electrically conductive intermediate layers are provided, wherein each intermediate layer is capacitively coupled with two contact surfaces. With such an embodiment, multiple capacitances may be integrated in the function unit.

In another embodiment of the function unit, intermediate layers of a stack are connected with one another conductively via a feedthrough that extends through the carrier. This embodiment of the function unit has the advantage that elements applied to the exterior of the carrier for the electrically conductive connection of intermediate layers may be dispensed with, thereby reducing the space taken up by the function unit.

In another embodiment of the function unit, a multilayer capacitor is created from a first stack of intermediate layers lying one upon the other and a second stack of intermediate layers lying one upon the other. The first stack of intermediate layers lying upon one another is galvanically connected with a contact surface. The second stack of intermediate layers lying upon one another is capacitively coupled with a contact surface.

This embodiment of the function unit has the advantage that the concept of galvanic coupling may be associated with the concept of capacitive coupling of the capacitor with external connections in the same capacitor.

In another embodiment of the function unit, at least two intermediate layers are provided that are capacitively coupled with a common contact surface. With such an embodiment of the function unit, it is possible to construct a component that has two capacitances, wherein both capacitances are related to the same contact surface, which may be an earth contact for example.

Thus, components and capacitances may already be connected simply by the arrangement of electrodes. This connection may be achieved without requiring connecting elements in the form of circuits or wires.

In another embodiment of the function unit, a ceramic layer is provided between a contact surface and an intermediate layer capacitively coupled therewith. The ceramic layer contains a varistor material. In this way, a varistor is formed between the contact surface and the intermediate layer. The switching voltage of the varistor may be set by the selection of the distance between the contact surface and the intermediate layer. Advantageously, a switching voltage is set between 5 and 300 V; especially preferable is a switching voltage between 10 and 100 V.

This embodiment of the function unit has the advantage that, besides the capacitor that is formed by the contact surface and the intermediate layer, a voltage-dependent resistor, i.e. a varistor, may also be integrated in the carrier. In this way, the function spectrum of the function unit may be extended.

In another embodiment of the function unit, the surface area of the carrier is less than 1 mm$^2$, at least two intermediate layers being integrated in the carrier.

This embodiment of the function unit has the advantage that it requires very little space when soldering to circuit board.

In another embodiment of the function unit, it is provided that the capacitances formed between the intermediate layers and the contact surfaces have different values. In this way, it is possible to create filtering components that have different filter capacitances.

In another embodiment of the function unit, it is provided that the capacitances formed between the intermediate layers and the contact surfaces have the same capacitance values. In this way, it is possible to create filtering components in which the same capacitance is present for each branch to be filtered.

In another embodiment of the function unit, at least one of the ceramic layers contains a capacitor material that is selected from the following set of materials: C0G, X7R, Z5U, Y5V, HQM.

In a further embodiment of the function unit, it is provided that at least one of the ceramic layers contains a varistor ceramic that is selected from among the following set of varistor ceramics: ZnO—Bi, ZNO—Pr.

In another embodiment of the function unit, it is provided that a conductive surface is formed from a material that contains at least one of the following materials: silver, silver-palladium, silver-nickel-tin, silver-nickel-palladium-gold, silver-nickel-vanadium-copper.

In the following, the invention will be explained in greater detail with reference to embodiments and the associated Drawings. Identical elements or elements with equivalent effect or that serve the same purpose are designated with the same reference numerals.

DESCRIPTION OF THE DRAWINGS

Drawing 1 shows a top view of a first exemplary function unit.

Drawing 2 shows a longitudinal section through the function unit of Drawing 1 along the line I-I.

Figure 8:
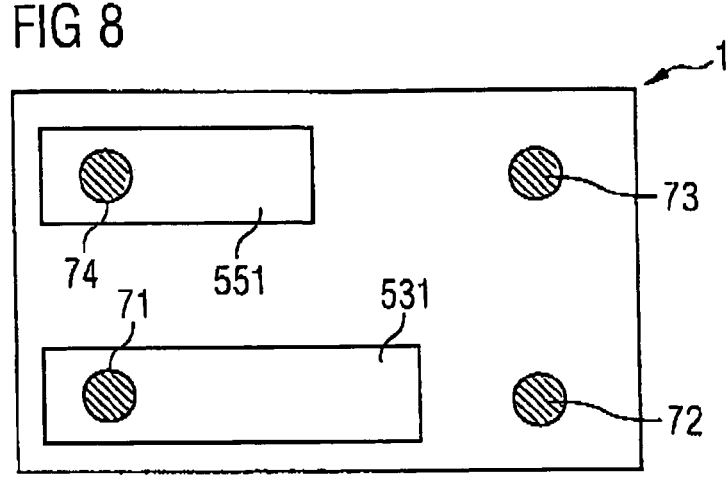
Figure 9:
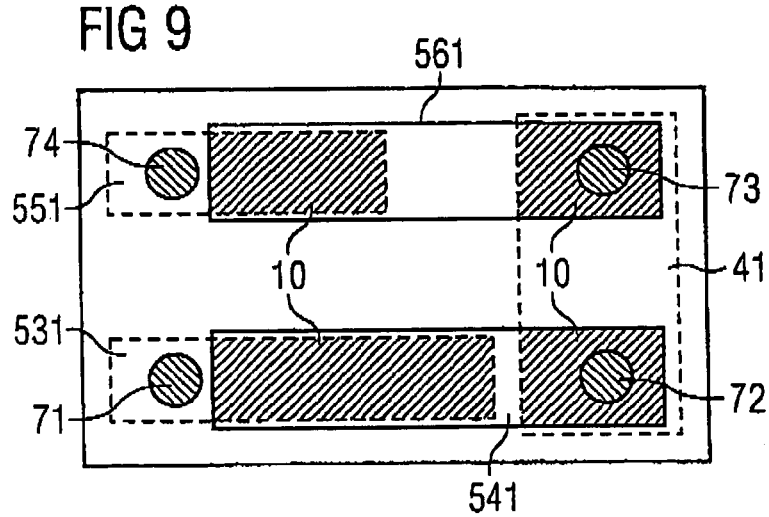
Figure 10:
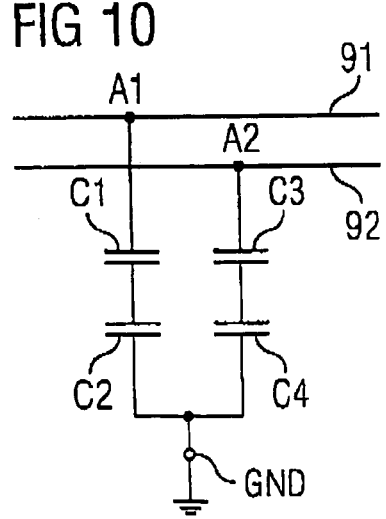

Drawing 3 shows an equivalent circuit diagram for the function unit of Drawing 1.

Drawing 4 shows another equivalent circuit diagram for the function unit of Drawing 1.

Drawing 5 shows a top view of another exemplary function unit.

Drawing 6 shows a longitudinal section through the function unit of Drawing 5 along line I-I.

Drawing 7 shows a longitudinal section through the function unit of Drawing 5 along line II-II.

Drawing 8 shows a cross-section through a function unit of Drawing 5 along a plane that includes line IV-IV in Drawings 6 and 7.

Drawing 9 shows a cross-section through function unit of Drawing 5 in a plane which includes line III-III of Drawing 7.

Drawing 10 shows the application of a function unit in a connection with circuits.

DETAILED DESCRIPTION

Drawing 1 shows a top view of a function unit. Three contact layers 41, 42, 43 are arranged on the top side of a carrier 1. The top side of the carrier is preferably defined as the top side of the uppermost of the ceramic layers that form carrier 1. Contact layer 42 forms a connection A2 of the function unit. Contact surface 43 forms a connection A1 of the function unit. Contact surface 41 forms a ground connector GND of the function unit.

Conductive intermediate layers 51, 52, which do not lie on the top side of the component and are not actually visible in the top view, are indicated in Drawing 1. For the sake of clarity, they are therefore represented by dashed outlines. A first conductive intermediate layer 51 and a second conductive intermediate layer 52 are shown. As may be seen in Drawing 2, conductive intermediate layers 51, 52 are arranged between two ceramic layers 2. A capacitor is formed by the overlapping of contact layer 43 with intermediate layer 52. In the same way, a capacitor is formed by the overlapping of contact 42 with intermediate layer 51. This capacitor 63 is indicated in Drawing 2. Other capacitors are formed by the overlap of contact layer 41 with intermediate layer 52 and/or intermediate layer 51. Capacitor 64, which is formed by the overlap with intermediate layer 51, is shown schematically in Drawing 2.

In Drawing 1, the footprint a of the carrier is presented. This footprint is based on the area of the outermost rectangle. This footprint is preferably less than 1 mm$^2$, especially preferably about 0.5 mm$^2$.

Drawing 2, also shows that contact layers 42, 41 each form a contact surface 31, 32 on their lower side, in other words at the edge of the carrier of the function unit and at the edge of uppermost ceramic layer 2 respectively. This contact surface is necessary for creating a capacitor. To create contact surfaces 31, 32 it is not essential to use contacts in the form of layer contacts. The external contacts or external connectors A1, A2, GND might also be realized by differently shaped electrically conductive bodies.

Drawings 1 and 4 also show that an important factor may be that an overlap between different layers only occurs within precisely defined limits. In this way, for example, no overlap occurs between intermediate layers 51, 52.

Both of these intermediate layers are located in a plane of the stack of dielectric layers lying one upon the other. Consequently, they are capacitively decoupled from one another relatively well. Parasitic capacitances between the intermediate layers 51, 52 thus hardly occur. In the same way, contact layers 41, 42, 43 are very clearly located apart from one another, so that parasitic capacitances are reduced between these intermediate layers as well. An overlap between contact layers 42 and intermediate layer 52, and conversely in the same way between contact layer 43 and intermediate layer 51, also does not occur. On the other hand, intermediate layers 51, 52 each have a common backplate electrode in contact layer 41 for creating a capacitor that capacitively couples intermediate layers 51, 52 with contact layer 41. However, as may be seen clearly in Drawing 1, these two capacitors are spaced well apart, since the overlapping surfaces between intermediate layers 51 and contact layer 41, and between intermediate layer 52 and contact layer 41, are evidently are located at a significant distance from each other.

With such a design of the function unit, undesirable parasitic capacitances may be drastically reduced, which is especially important for realizing very small capacitances.

Drawing 1 also shows that overlap surfaces between electrode surfaces are designated by hatching. This yields overlapping areas 10, which are each identified separately. When viewing overlapping areas 10, it may be seen that they are each largely at the maximum possible distance from one another, as is principally determined by the external dimensions of carrier 1.

By dispensing largely or entirely with galvanic coupling between the external electrodes and the internal electrodes in Drawing 1, it is also possible to reduce parasitic inductances very significantly.

Drawing 3 shows an equivalent circuit diagram for the function unit of Drawing 1. Here, the coupling of contact layer 42 with intermediate layer 51 forms a capacitor 63, which is designated in Drawing 3 as C3. With capacitor 64 of Drawing 2, which is connected in series therewith, capacitance C4 of Drawing 3 is formed. Similarly, contact layer 43, intermediate layer 52 and contact layer 41 also form two capacitances that are connected in series, and which are shown in Drawing 3 as C1 and C2. Thus, the overall result is an electric component with external connectors A1, A2, GND, which may be used as a filter component by connecting connector GND with a ground connection. Connectors A1 and A2 may each be connected with a circuit, wherein the signals transmitted in the circuits may be dejammed of high-frequency interference signals via the capacitances. High frequencies are in fact short-circuited to earth by the relatively low capacitances C1, C2 and C3, C4.

Drawing 3 applies essentially for ceramic layers that contain a dielectric suitable for capacitors.

In another embodiment of the function unit, a surge protection in the form of a varistor may also be integrated by selecting a suitable material for the ceramic layers. By selecting a varistor ceramic, which for example may be ZnO—Bi or ZnO—Pr, voltage-dependent resistors or varistors may be integrated besides the capacitors. The ceramic listed has an $\epsilon$ value that is suitable for creating a capacitor as well as the varistor property. In other words, the ohmic resistance depends on the voltage and also on a certain threshold voltage at which the varistor switches, and takes on very small values. The corresponding circuit diagram is shown in Drawing 4. Unlike Drawing 3, it may be seen that an additional varistor VDR1, VDR2, VDR3, VDR4 is connected in parallel to each capacitance C1, C2, C3, C4. Each varistor therefore also conducts a surge signal from a circuit to earth, wherein the earth may be connected to the GND connector.

Drawing 5 shows a further embodiment of the function unit, in which the pattern of contact layers 41, 42, 43 resembles that of Drawing 1. Unlike Drawing 1, no intermediate layers are indicated. However, feedthroughs 71, 72, 73, 74 are indicated that extend through the inside of carrier 1 perpendicularly to the ceramic layers.

An electric function unit in accordance with Drawing 5 may especially be used to produce a filter element with which rapid, high-frequency signals may be filtered or rapid, high-frequency interfering signals can be filtered out from a wanted signal. This is shown in Drawing 10, in which connectors A1 and A2 are connected to signal circuits 91, 92 respectively. The GND connector is connected to an earth. With this parallel connection of capacitors C1, C2 and C3, C4 interfering signals may be filtered to an earth.

The same applies moreover to both the equivalent circuit diagram of the function unit in accordance with Drawing 5 and to the function unit in accordance with Drawing 1; in other words, the circuit diagrams in accordance with Drawing 3 and Drawing 4 may be used, depending on whether the ceramic materials contain a capacitor material or a varistor ceramic.

Drawing 6 shows that in the embodiment in accordance with Drawing 5, conductive intermediate layers 531, 532, 533 are provided which are stacked upon each other and cover each other completely, and which are connected to each other in electrically conductive manner via a feedthrough 71 that extends perpendicularly to the layers. Feedthrough 71 is extended above the upper edge of carrier 1 and contacts contact layer 42 there.

In addition, electrically conductive intermediate layers 544, 543, 542, 541 are provided, which also form a stack of layers or internal electrodes lying on top of one another. These layers are also connected to each other in an electrically conductive manner via a feedthrough 72. However, unlike feedthrough 71, feedthrough 72 does not extend as far as the top edge of carrier 1, which is why there is also no galvanic connection between feedthrough 72 or the inner electrodes connected there and contact layer 41. The two stacks of layer electrodes arranged upon one another form a capacitor 61. This capacitor is galvanically connected to connector A2 of the function unit via contact layer 41. The capacitive coupling between contact layer 41 and essentially conductive intermediate layer 541 also constitutes a coupling to the GND connector of the function unit.

Drawing 6 further shows a delimiting line 8 to which the expansion of contact layer 42 to the right may be limited if necessary, to better prevent parasitic capacitances between contact layer 42 and conductive intermediate layer 541.

Drawing 6 also shows thickness d of uppermost ceramic layer 2, which separates contact layer 41 from the electrically conductive intermediate layer 541 beneath it. When arranging a varistor material between the two electrodes, the switching voltage of the varistor may be set by appropriate selection of layer thickness d. For example, with a layer thickness between 20 and 200 μm, the switching voltage of the varistor may be set to a value between 10 and 100 V. In this case, a ZnO—Bi material is used as the varistor ceramic.

Like Drawing 6, Drawing 7 shows the formation of a capacitor 62 from intermediate conductive layers 551, 552, 553, which form a stack of layer electrodes that are connected to each other in electrically conductive manner and also to contact layer 43 via feedthrough 74. As in Drawing 6, in Drawing 7 a second stack of electrode layers is also provided, arranged one upon the other and formed by conductive intermediate layers 561, 562, 563, 564. These layers too are connected to one another in an electrically conductive manner by a feedthrough, in particular via feedthrough 73. Contact layer 41 also has no electrically conductive contact with this feedthrough 73. Instead, in this case too capacitive coupling occurs between contact surface 31 and the conductive intermediate layer 561.

As may be seen in comparison with Drawing 8, conductive intermediate layers 551, 552, 553 that are assigned to feedthrough 74 are shorter than conductive intermediate layers 531, 532, 533. The result of this is that the capacitance of capacitor 61 is greater than the capacitance of capacitor 62, since the corresponding backing electrodes, which are formed from the conductive intermediate layers that are assigned to feedthroughs 72 and 73, each have the same surface areas. This is also evident in Drawing 9.

Drawing 8 shows a plane of the carrier that is formed by the top side of a ceramic layer. Two conductive intermediate layers 531, 551 are arranged on the ceramic layer, and they belong to different multilayer capacitors 61, 62 and are connected to other conductive intermediate layers and an outer contact surface via feedthroughs 71 and 74 respectively. Conductive intermediate layers 531 and 551 are spaced relatively far apart, providing good avoidance of parasitic capacitances.

Drawing 9 shows a cross-section in a different plane of the function unit, wherein conductive intermediate layers 561 and 541 assigned to the GND ground connector are represented by continuous lines. In addition, conductive intermediate layers 551 and 531 that do not lie on the same plane are represented by dashed lines. Moreover, the overlap area 10 which is formed by each of the overlaps of conductive intermediate layers 561 and 551 or 531 and 541 or by the overlapping of electrically conductive layers 541, 561 with contact layer 41, is hatched. Contact layer 41 is coupled with conductive intermediate layers 541 or 561 by the formation of a capacitor 63 or 64, as may be seen in Drawings 6 and 7.

Drawing 10 shows a use of the function unit in accordance with Drawing 5 for filtering signal circuits 91, 92. Capacitance C1 is represented by capacitor 62 in Drawing 7. Capacitance C2 is formed by capacitor 64 in Drawing 7. Capacitance C3 is formed by multilayer capacitor 61 in Drawing 6. Capacitance C4 is formed by capacitor 63 in Drawing 6.

In a refinement of the embodiment in accordance with Drawing 5, it is also possible to couple capacitively the galvanically coupled stack of electrode layers lying upon one another in Drawing 6 and Drawing 7 in the same way as with the GND connector. In this case, one would insert an additional conductive intermediate layer above conductive intermediate layer 541 or 561, which would then be assigned to feedthrough 74 or 71, and also interrupt the contact between feedthrough 71 or 74 and contact surface 32 or 33 respectively.

With a component in accordance with Drawing 5, it is possible to set capacitances that are effective between connector A1 and the GND connector or between connector A2 and the GND connector and that measure between 22 pF and 1 μF.

Using the varistors integrated in the carrier, the function of eliminating interference from voltage peaks may also be integrated in the function unit as well as filtering high-frequency signals.

The invention is not limited to the embodiments presented and described. Furthermore, it also includes all technical modifications and partial and sub-combinations of the features and measures described and/or represented.

The invention claimed is:

1. An electrical function unit comprising:
    a carrier comprising dielectric layers and electrically conductive layers, the dielectric layers and electrically conductive layers being stacked such that electrically conductive layers are between dielectric layers; and
    a first contact on a surface of the carrier;
    wherein the dielectric layers and electrically conductive layers form a multilayer capacitor in the carrier, the multilayer capacitor comprising a first stack of first electrically conductive layers that are electrically interconnected and a second stack of second electrically conductive layers that are electrically interconnected; and
    wherein the first stack is capacitively coupled to the first contact, the first contact having substantially no galvanic connection to the first stack or to the second stack.

2. The electrical functional unit of claim 1, further comprising:
    at least one additional contact on the surface of the carrier.

3. The electrical functional unit of claim 2, wherein the first stack comprises a terminal conductive layer, the terminal conductive layer being capacitively coupled to the at least one additional contact.

4. The electrical functional unit of claim 2, wherein the first stack comprises a terminal conductive layer, the terminal conductive layer being galvanically coupled to the at least one additional contact.

5. The electrical functional unit of claim 1, wherein at least one of the electrically conductive layers is capacitively coupled to two contacts on the surface of the carrier.

6. The electrical functional unit of claim 1, further comprising:
   a first feedthrough that is inside the carrier and that connects the electrically conductive layers in the first stack; and
   a second feedthrough that is inside the carrier and that connects the electrically conductive layers in the second stack.

7. The electrical functional unit of claim 1, further comprising:
   a second contact to which the second stack is coupled galvanically.

8. The electrical functional unit of claim 1, wherein at least two of the electrically conductive layers are capacitively coupled to a common contact.

9. The electrical functional unit of claim 1, wherein the first stack comprises a first dielectric layer comprising varistor material, the first dielectric layer being between the first contact and at least one of the first electrically conductive layers that are capacitively coupled to the first contact;
   wherein the first contact, the first dielectric layer, and the first electrically conductive layer together form a varistor; and
   wherein a switching voltage of the varistor is between 5 V and 300 V, the switching voltage being dependent on a distance between the first contact and the first electrically conductive layer.

10. The electrical functional unit of claim 1, wherein a footprint of the carrier is less than 1 $mm^2$.

11. The electrical functional unit of claim 1, further comprising a second contact on the surface of the carrier;
    wherein capacitances associated with the first and second contacts are different.

12. The electrical functional unit of claim 1, further comprising a second contact on the surface of the carrier;
    wherein capacitances associated with the first and second contacts are about equal.

13. The electrical functional unit of claim 1, wherein at least one of the dielectric layers comprises a ceramic material.

14. The electrical functional unit of claim 13, wherein the at least one dielectric layer comprises a capacitor material selected from the following materials: C0G, X7R, Z5U, Y5V, HQM.

15. The electrical functional unit of claim 1, wherein at least one of the dielectric layers comprises a varistor ceramic that is selected from the following ceramics: ZnO—Bi, ZnO—Pr.

16. The electrical functional unit of claim 1, wherein the first contact comprises at least one of the following materials: silver-palladium, silver-nickel-tin, silver-nickel-palladium-gold, aluminum-nickel-vanadium-gold, aluminum-nickel-vanadium-copper.

17. An electrical functional unit comprising:
    a carrier comprising ceramic layers and electrically conductive layers, the ceramic layers and electrically conductive layers being stacked such that at least part of each electrically conductive layer is between ceramic layers; and
    contacts on a surface of the carrier, the contacts comprising a first contact;
    wherein the ceramic layers and the electrically conductive layers form a multilayer capacitor in the carrier, the multilayer capacitor comprising a first stack of electrically conductive layers that are interconnected and a second stack of electrically conductive layers that are interconnected;
    wherein the first stack is capacitively coupled to the first contact; and
    wherein the first stack has substantially no galvanic connection to a contact on the surface of the carrier.

18. The electrical functional unit of claim 17, further comprising:
    a first conductor that is inside the carrier and that connects the electrically conductive layers in the first stack; and
    a second conductor that is inside the carrier and that connects the electrically conductive layers in the second stack.

19. The electrical functional unit of claim 18, wherein the contacts comprise a second contact on the surface of the carrier; and
    wherein capacitances associated with the first and second contacts are different.

20. The electrical functional unit of claim 18, wherein the contacts comprise a second contact on the surface of the carrier; and
    wherein capacitances associated with the first and second contacts are substantially identical.

* * * * *